United States Patent [19]
Aboul-Nasr

[11] Patent Number: 5,118,388
[45] Date of Patent: * Jun. 2, 1992

[54] POLYMER MELT DISTRIBUTOR

[75] Inventor: Osman T. Aboul-Nasr, Leominster, Mass.

[73] Assignee: Polysar Financial Services S.A., Fribourg, Switzerland

[*] Notice: The portion of the term of this patent subsequent to Jun. 19, 2007 has been disclaimed.

[21] Appl. No.: 507,740

[22] Filed: Apr. 12, 1990

[51] Int. Cl.$^5$ .......................... B01D 1/00; B29D 7/00
[52] U.S. Cl. ...................... 159/2.1; 159/43.1; 159/DIG. 10; 159/DIG. 16; 264/101; 425/72.1; 425/72.2; 528/501
[58] Field of Search ............... 159/2.1, 43.1, DIG. 10, 159/46, DIG. 16; 528/501; 264/101, 102; 425/72.1, 72.2

[56] References Cited

U.S. PATENT DOCUMENTS

| | | | |
|---|---|---|---|
| 3,724,976 | 4/1973 | Rode | 425/72.1 |
| 3,747,304 | 7/1973 | Elmer et al. | 55/178 |
| 3,933,953 | 1/1976 | Leva | 261/113 |
| 3,970,417 | 7/1976 | Page | 425/72.2 |
| 4,153,501 | 5/1979 | Fink et al. | 159/DIG. 10 |
| 4,294,652 | 10/1981 | Newman | 159/2.1 |
| 4,627,805 | 12/1986 | Schnell | 425/72.1 |
| 4,934,433 | 6/1990 | Aboul-Nasr | 159/43.1 |

Primary Examiner—Virginia Manoharan
Attorney, Agent, or Firm—Stevens, Davis, Miller & Mosher

[57] ABSTRACT

A horizontal polymer melt distributor is formed from a prism shaped distributor which cooperates with a horizontal tray positioned below the prism shaped distributor. Polymer melt flows into and expands in the distributor then overflows onto the tray. This design holds the polymer melt in the devolatilizer to reduce the content of monomer, dimers and solvent/diluent in the polymer.

6 Claims, 2 Drawing Sheets

POLYMER MELT DISTRIBUTOR

FIELD OF THE INVENTION

The present invention relates to horizontal distributors which may be used in the upper end of a devolatilizer. The present invention also relates to a process for using such a distributor in the devolatilization of a polymer melt.

BACKGROUND OF THE INVENTION

In the manufacture of polymers by the bulk, or solution process it is generally required to significantly reduce the amount of residual monomer, and dimers, trimers and other oligomers and diluent, if present. This may be accomplished using a number of methods. For example the unfinished polymer may be passed through an extruder which has a section under vacuum. The polymer melt in the extruder is subject to working by the screw and a large surface area of melt is exposed to the vacuum. While the process is useful it subjects the polymer melt to shear which may cause polymer degradation. Additionally, it is usually carried out as a separate process step and may require additional manpower.

In bulk or solution polymerization where the polymer is reacted in the form of a melt, the melt may be heated then passed through a preheater into a devolatilization chamber. The melt also undergoes some shear as it is typically pumped from the reactor to the preheater using a gear pump. However, the shear is lower than that in an extruder. Typically the preheater is on top of the devolatilizer and is a tube and shell type heat exchanger. The polymer flows through the tubes and descends to the bottom of the devolatilizer as continuous strands. Unfortunately, in this process there are competing factors which affect the devolatilization. The residual monomers and/or dimers, and diluent, if present, will diffuse out of the melt faster at lower polymer melt viscosities. Unfortunately, at lower polymer melt viscosities, the polymer descends to the bottom of the devolatilizer faster and there is less time for the residual monomer, dimer, and diluent, if present, to diffuse out of the melt.

One method of overcoming this problem is to use a series of devolatilizers in sequence, as disclosed in U.S. Pat. No. 4,294,652 issued Oct. 13, 1981. While this approach may permit the polymer to be held in the form of a strand longer it represents an increase in capital cost, and maintenance costs.

Another approach is to flow the polymer melt down the surface of a plate heat exchanger as disclosed in U.S. Pat. No. 4,153,501 issued May 8, 1979. The present invention does not contemplate such a vertical plate heat exchanger.

A third approach is disclosed in applicant's U.S. Pat. No. 4,934,433 issued Jun. 19, 1990. The approach in that case is to use a horizontal polymer distributor which comprises a first enclosed section to permit polymer melt foaming or boiling and a second section to permit devolatilization and polymer melt strand formation. The apparatus disclosed in the U.S. patent application Ser. No. 271,636 does not contemplate the use of a weir. Furthermore, the patent application does not contemplate the use of a horizontal distributor tray as required in the present patent application.

Accordingly, the present invention provides a novel horizontal distributor means to be used in the upper end of a devolatilizer; and a process for its use. The polymer melts devolatilized using the distributor of the invention have a reduced content of residual monomer, dimer, and diluent, if present, relative to the use of a devolatilizer where such a horizontal distributor is not used.

SUMMARY OF THE INVENTION

The present invention provides a horizontal polymer melt distributor adapted to be used in the upper end of a reduced pressure devolatilizer said distributor comprising in cooperating arrangement:

i) an inlet means and a die assembly adapted to cooperate with and receive polymer melt from a preheater, said die assembly comprising oppositely facing flange plates connected about a central die plate, said flange plates having essentially equisized openings therethrough and having an inward taper towards said die plate, said die plate bearing a number of holes therethrough connecting the central openings through said flange plates, the total across sectional area of said holes being less than the minimum cross sectional area of the central openings through said flange plates;

ii) a partially enclosed first section having a cross sectional area greater than the minimum cross sectional area through said flange plates said first section comprising of polyhedron provided that one or more faces of said polyhedron provide a back wall cooperating with one of said flanges to provide an inlet for polymer melt into said polyhedron; one or more faces of said polyhedron provide an essentially planar base which relative to said inlet faces downward and gently slopes forward; one or more faces of said polyhedron provide a weir comprising relative to said base and said inlet one or more upwardly, outwardly facing surfaces and a plurality of holes through the base at the foot of the weir so that there are no areas of low flow in said polyhedron; said polyhedron having at least one or more upwardly facing openings, relative to said inlet, and having a heating means positioned within it at a height above said base but less than the vertical height of said weir; and iii) spaced below but positioned to receive polymer melt overflow from said weir an essentially horizontal tray comprising a base having a plurality of strand forming holes therethrough, a continuous lip extending around the perimeter of said tray.

The present invention also provides a process of devolatilizing a polymer melt which comprises passing said polymer melt through a preheater and a horizontal distributor means into a devolatilizer wherein the preheater is operated at temperature and pressure conditions such that the vapour pressure of residual monomer, dimers and diluent, if present, is greater than the pressure within the preheater and said polymer melt passes from said preheater into said devolatilizer through a horizontal distributor means comprising:

i) an inlet means and a die assembly adapted to cooperate with and receive polymer melt from said preheater, said die assembly comprising oppositely facing flange plates connected about a central die plate, said flange plates having essentially equisized openings therethrough and having an inward taper towards said die plate, said die plate bearing a number of holes therethrough connecting the central openings through said flange plates, the total cross sectional area of said holes being less than the minimum cross sectional area of the central openings through said flange plates;

ii) a partially enclosed first section having a cross sectional area greater than the minimum cross sectional area through said flange plates said first section comprising of polyhedron provided that one or more faces of said polyhedron provide a back wall cooperating with one of said flanges to provide an inlet for polymer melt into said polyhedron; one or more faces of said polyhedron provide an essentially planar base which relative to said inlet faces downward and gently slopes forward; one or more faces of said polyhedron provide a weir comprising relative to said base and said inlet one or more upwardly, outwardly facing surfaces and a plurality of holes through the base at the foot of the weir so that there are no areas of low flow in said polyhedron; said polyhedron having at least one or more upwardly facing openings, relative to said inlet, and having a heating means positioned within it at a height above said base but less than the vertical height of said weir; and iii) spaced below but positioned to receive polymer melt overflow from said weir an essentially horizontal tray comprising a base having a plurality of strand forming holes therethrough, a continuous lip extending around the perimeter of said tray.

DETAILED DESCRIPTION OF THE INVENTION

Figure 1:
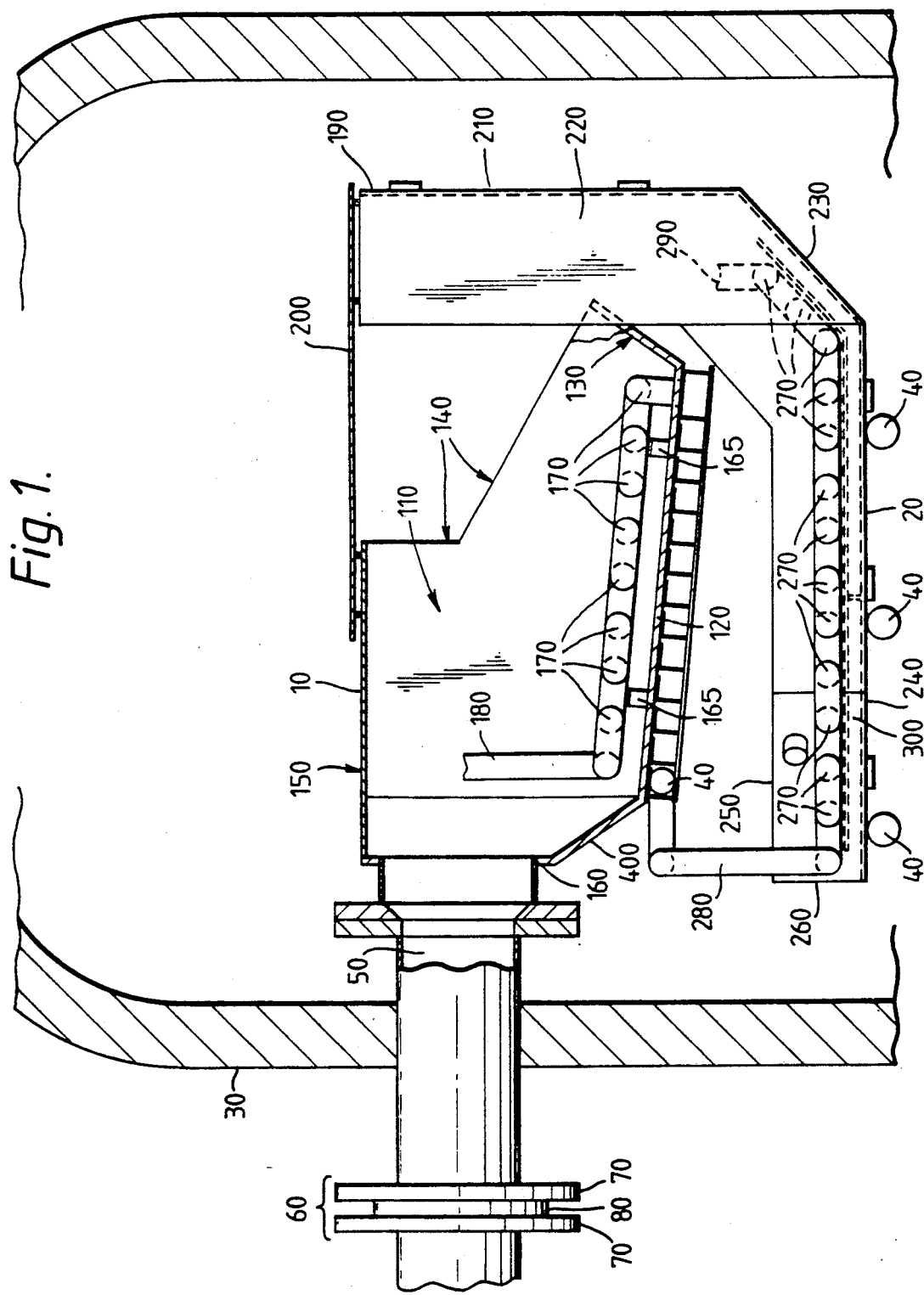
FIG. 1 is a plan view of a distributor according to the present invention.

In the prior art in the bulk polymerization of a polymer such as polystyrene a mixture of monomer and optionally diluent, such as ethyl benzene, is polymerized to a controlled conversion at temperatures of about 150° C. The material exiting the reactor may contain up to 30% of monomer, oligomers, and diluent. The mixture leaving the reactor is passed through a preheater or heat exchanger, usually a shell and tube type heat exchanger up to temperatures of a maximum of 260° C. preferably up to 250° C. A high pressure pump such as a gear pump is usually used to force the melt through the heat exchanger. The polymer melt then leaves the preheater and enters the devolatilization chamber. The devolatilization chamber is operated at temperatures up to about 260° C. typically from 230° to 250° C. and pressures from about 1 to 50, preferably about 5 to 25 mm, most preferably 5-8 mm Hg. As the hot melt flows out of the preheater in strands into the devolatilization chamber, it foams and the volatile residual materials in the polymer melt are flashed off. The melt then descends to the bottom of the devolatilizer where it collects in a pool and is pumped to the next process stage.

Preferably in accordance with a further aspect of the present invention there is provided a process for devolatilization of a polymer melt in which the preheater is operated at temperature and pressure conditions so that the pressure within the preheater is less than the vapor pressure of the residual materials in the polymer melt such as monomers, dimers and diluent. It is believed that the melt starts to effervesce or froth in the preheater with some of the residual materials forming a discontinuous vapor phase within the continuous polymer melt. The pressure of the polymer melt within the preheater is controlled by a pump and by the number and diameter of the holes in the die plate at the inlet to the devolatilizer. The pressure in the preheater is controlled such that a substantial amount of residual monomer and diluent evaporate or form a vapor phase in the preheater. The polymer phase of the melt entering the devolatilizer through the die plate will have a dissolved volatile content of 2 to 10, preferably 3 to 7 percent. The pressure of the polymer melt in the preheater in accordance with a preferred method of using the distributor, is from 10 to 30 preferably about 20 to 30 psig., most preferably about 24 to 28 psig. at temperatures up to 260° C., preferably from about 220 to 240° C. Care must be taken that the polymer melt is not exposed to too high a temperature for excessive time or degradation may tend to occur. The polymer melt flows from the preheater into a horizontal distribution means at the upper end of the devolatilization chamber.

The distributor comprises a horizontal inlet from the preheater to receive polymer melt. The first section is partially enclosed and has a cross sectional area greater then the minimum cross section area of inlet which permits the polymer melt to expand and foam. The first section has a cross section area greater than the minimum cross section areas of the inlet (e.g. - the cross section area of holes through the die plate). The expansion of the polymer melt is due to the reduced pressure within the devolatilizer relative to the pressure in the preheater. The polymer melt expansion provides a larger surface area to permit residual material to volatilize into and also from the foam structure into the devolatilization chamber. The second stage of the distributor comprises one or more subsequent trays with a series of hold there through.

In accordance with a preferred aspect of the present invention either or both of the first section or the tray may be heated. If the heaters are present they are generally used during startup or shut down of the process to ensure that polymer does not stick to the distributor.

Without being bound by theory it is believed that the principle of operation is as follows.

The pressure of the melt drops gradually in the preheater until the volatile materials start to effervesce or boil. The pressure drop across the die plate is such that the polymer melt leaves the die plate containing 2 to 10, preferably 3 to 7 percent volatiles. The vapors formed in the preheater disengage from the melt, as the melt and entrained vapor crosses the die plate. The remaining volatile materials in the melt start to boil forming foam, which enhances further devolatilization through the increased surface area of the melt. As the foam flows through the first section of the devolatilizer the vapor disengages from the foamed polymer melt and escapes through the openings or apertures in the first section. The melt then flows over the weir and is deposited on the tray. The melt flows across the tray and through strand forming holes in the tray to descend as strands to the bottom of the devolatilizer. The final stage of devolatilization take place from the polymer melt strands and pool in the bottom of the devolatilizer.

If the pressure in the preheater is too low, too much of the volatile material in the melt will form the vapour phase. There will not be sufficient volatile material in the polymer melt to froth the melt sufficiently for efficient devolatilization.

If the pressure in the preheater is too high, too much volatile material will be in the polymer melt phase. This is detrimental in two ways. First, the dwell time of the polymer melt in the devolatilizer may not be sufficiently long for adequate devolatilization. Secondly, as the volatiles evaporate, they will extract heat from the melt lowering its temperature reducing the diffusion coefficient and increasing the viscosity of the polymer melt. The lower diffusion coefficient retards the devolatilization process while the higher viscosity retards the separation of the vapor bubbles from the melt. If the vapor bubbles do not separate from the melt they may be compressed and condensed by the melt pump at the bottom of the devolatilizer and will raise the concentration of residual volatile material in the finished polymer.

In the first section the bubbles within the foamed polymer melt will tend to burst open permitting the volatile residual materials to be drawn off through the devolatilization chamber.

The opening or apertures in the first section face upward and outward relative to the inlet. It goes without saying that the aperture openings are above the weir. The apertures permit the devolatilization of the bubbles of volatile materials from the melt and from the surface of the melt.

Preferably, in operation the bottom of the polyhedron is essentially planar with a slight or gentle downward and forward slope relative to the inlet. The polymer melt entering the first section forms a froth which flows forward until it reaches the weir. The level of the froth must rise until the froth flows over the weir. To prevent polymer burning or degrading there are a series of drain holes at the juncture of the weir and the bottom of the polyhedron. This reduces the "dead spots" or areas where there is no or very low flow in the first section. This reduces likelihood of polymer degradation. Preferably, in front of the weir is a deflector or shield. The deflector plate prevents splatter on the wall of the vessel. This reduces formation of black specks. The deflector may be an essentially planar vertical plate, or an essentially "U" shaped vertical plate.

The froth flows over the weir or through the drain holes and is deposited on the upper surface of a tray which has a plurality of strand forming holes in it through which the polymer melt flows and descends as strands to the bottom of the devolatilizer. The selection of hole size and location to produce strands is known to those skilled in the art. Typically the size of holes in the tray will range from about 0.5 inches (1 cm) to about 2 inches (about 5 cm) most preferably from 0.75 inches (about 1.8 cm) to 1.25 inches (about 3.0 cm).

The first section may be heated. A hot oil or electric resistance heater is preferred but other heating means may be suitable. The tray may also be heated. If the tray is heated the heating means should be placed in the tray so that the top of the heater is below the top of the walls of the tray. Preferably the heater will be spaced above the bottom of the first section on spacer bars or ridges. Similarly if the first section is heated the heater will be below the top edge of the weir. The temperature of the distributor should be up to 260, preferably from 220° to 250° C., most preferably from 230° to 250° C.

The first section should be of a shape so that there is essentially linear flow within the distributor. The distributor must provide a suitable residence time and fit within the devolatilizer. The temperature, pressure and polymer residence time in the devolatilizer will control the degree of devolatilization of the polymer. Under typical pressures and temperatures in a devolatilizer the residence time in the distributor may be up to about 10 minutes, preferably from about 3 to 8 minutes, most preferably about 5 minutes. Preferably, sharp elbows or joints in the distributor where there would be low polymer flow rates are avoided.

A die plate serves to maintain the pressure drop from the preheater to the distributor in the devolatilizer. This permits the preheater to be maintained at pressures of 10 to 30 psig while the devolatilizer is maintained at pressures as low as about 1, preferably about 5 to 25 mm Hg. The total cross section area of the holes in the die plate should be less than the cross section area of the first section. Preferably the ratio of cross section area of the holes through the die plate to the cross section area of the first section is in the range of 1:5 to 1:10. Preferably the holes are tapered or at least partially tapered reducing in size in the direction of flow of the polymer melt. The die may be mounted at the distributor inlet between a pair of equisized flange plates having central openings therethrough having an inward taper towards the die plate.

The apparatus aspect of the present invention will be more fully described in accordance with the drawings in which the distributor is in the shape of a candy scoop or dust pan and like parts have like numbers.

Figure 2A:
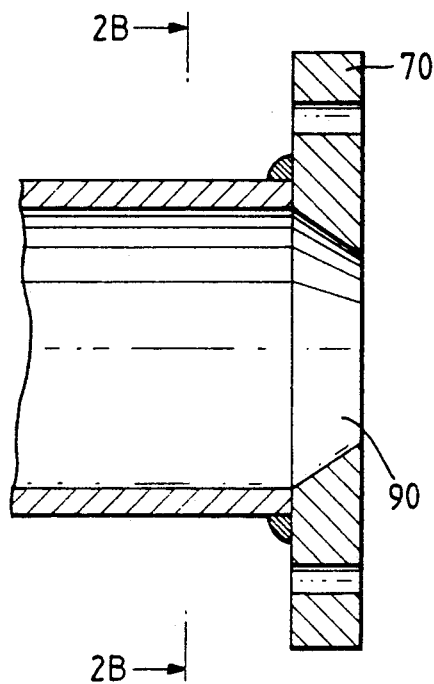
FIGS. 2A and 2B are sectional and a front view of the flanges, respectively.
Figure 2B:
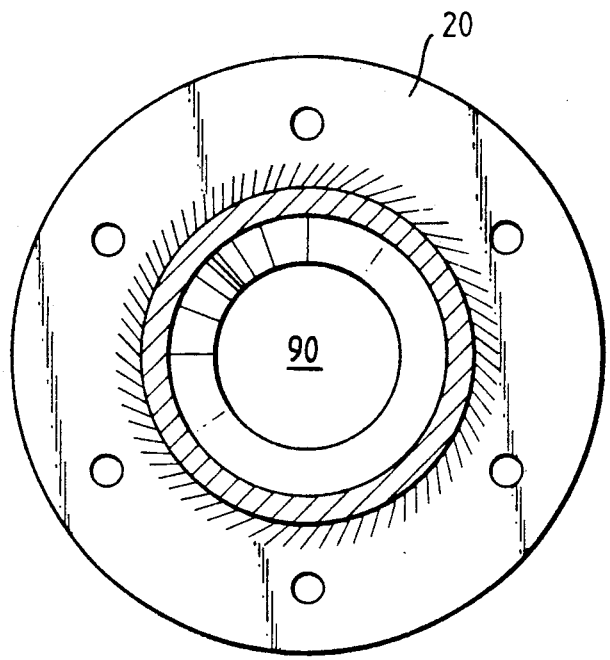
Figure 3A:
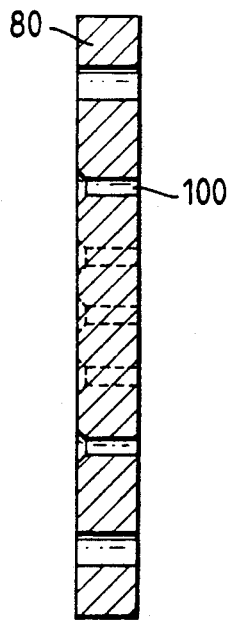
FIGS. 3A and 3B are sectional and a front view of the die plate respectively.
Figure 3B:
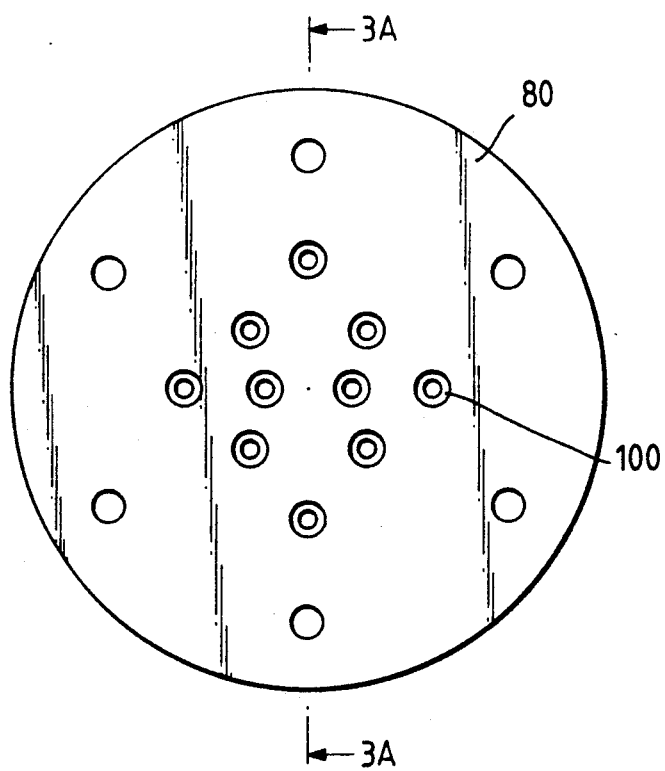

Referring to FIG. 1 it can be seen that the first section 10 and the tray 20 are supported horizontally within the upper end of the devolatilization chamber 30 by support rods 40. A polymer melt inlet 50 passes through the sidewall of devolatilization chamber 30 and is connected to the distributor through die assembly 60. The die assembly 60 comprises a pair of flange plates 70 with a die plate 80 disposed there between. FIGS. 2A and 2B a sectional and a back view of the flanges respectively, show the flange plates each have an inwardly tapered opening 90 therethrough (e.g. they narrow toward the face of the flange or the die plate). FIGS. 3A and 3B are a sectional and a front view of the die plate and show that the die plate 80 has a plurality of tapered holes 100 therethrough. The die plate 80 is placed between the flanges so that the holes are tapered in the direction of flow of polymer melt into the distributor. The number and diameter of holes are selected to maintain the pressure on the polymer melt within the preheater and to control the flow of the polymer melt into the distributor.

The first section 10 comprises a polyhedron. In the embodiment shown in FIG. 1 the polyhedron is a prism. That is it has two parallel bases (in this case sides) 110. The bases 110 are equispaced about inlet 50. The polyhedron need not be a prism, for example it could be partially dome shaped. It is, however, necessary that the first section have an essentially planar base 120 which slopes gently, at an angle of not more than about 10° preferably less than 5° below horizontal, toward the front (or away from inlet 50) of the first section. At the front of the first section is a weir 130. In the illustrated embodiment of the present invention the vertical height of the weir 130 is below the bottom of inlet 50. While it is not essential that the weir have a vertical height below the bottom of the inlet, it reduces "dead spots" in the flow of polymer melt in the first section. If, however, the weir is too low the polymer melt will flow out of the first section too rapidly and the melt will not have sufficient dwell time in the devolatilizer.

On the upper surface of the first section are one or more openings, 140 to permit the escape of volatiles from the melt into the devolatilizer. In the embodiment illustrated, there is also a top 150, to the first section, a back wall 160, and a sharp downward sloping intermediate wall 400 joining the back wall to the base.

Inside the first section there is a series of supports 165 which support heating elements 170. The heating elements in this case are hot oil heating tubes, but they could also be electrical heaters or other suitable immersion heaters. The heaters are positioned in the first section at a height below the top edge of the weir 130. In FIG. 1 the oil input line is partially shown at 180. The heater may provide heat to the frothed polymer melt to reduce the heat loss due to evaporation of monomer, dimer, and diluent, if present.

In front of the opening 140 in the front of the polyhedron there is a deflector 190. The deflector 190 comprises a top plate 200, a back plate 210, two side plates 220, and a sloping bottom plate 230. The top plate 200 also serves as a hanger for the deflector from the polyhedron. The deflector forms a "U" shaped cup or plate in front of the opening 140 in the polyhedron. The deflector could also be an essentially planar vertical plate. The deflector prevents splatter of the foamed polymer melt from the first section to the sides of the devolatilizer 30.

Additionally the deflector cooperates with tray 20 below the first section to ensure that polymer froth does not fall outside the tray 20. Thus, tray 20 fits inside the two side plates 220 and above and in cooperating arrangement with sloping base plate 230.

The tray 20 comprises a base 240, two side walls 250, a back wall 260, and a front wall (not shown) which cooperates with the deflector.

Inside the tray, at a height below the height of the walls of the tray are suitable immersion heater elements 270 of the type discussed above. In this particular embodiment the hot oil from the heater elements 170 in the first section 10 is conveyed to the heater elements 270 in the second section by a pipe 280. However, the source of hot oil can be independent of the top section. The outlet or return for the hot oil is partially shown at 290. The heating elements rest on a series of spacers 300 and are spaced above the bottom 240 of the tray and below the top of the walls of the tray. There are a series of strand forming holes through the bottom of the tray so the polymer melt will form strands as it descends to the bottom of the devolatilizer. It should be noted that the polymer melt will also continue to devolatilize in the tray prior to forming strands.

The distributor of the present invention should provide a dwell or residence time in the distributor of up to 10 minutes, preferably from about 3 to 8 minutes, most preferably about 5 minutes.

The distributor of the present invention has been described in association with the devolatilization of polystyrene. The devolatilizer may be used in association with any polymer which is or may be devolatilized using a low pressure devolatilizer.

The present invention will be illustrated by the following example, in which parts are parts of weight (e.g. 1 lb.). The example is intended to illustrate and not to limit the invention.

EXAMPLE 1

A distributor in the shape of a "candy scoop" was installed in a polystyrene plant which used a perforated pipe type horizontal distributor, in a falling strand devolatilizer. The average total residuals, sytrene monomer residuals and ethyl benzene residuals were measured for the polymer devolatilized using the perforated pipe distributor and the "candy scoop" distributor of the present invention. The results are set forth in table 1.

TABLE 1

| Distributor | Perforated Pipe | "Candy Scoop" |
| --- | --- | --- |
| Average Total Residuals | 1100 | 520 |
| Average Styrene | 925 | 300 |
| Average Ethylbenzene | 175 | 20 |

The "candy scoop" distributor of the present invention is significantly more efficient in the reduction of monomers, oligomers and diluent, then the conventional prior art pipe distributor.

What is claimed is:

1. In the upper end of a reduced pressure devolatilizer a horizontal polymer melt distributor comprising in cooperating arrangement:
   (i) an inlet means and a die assembly, said die assembly comprising oppositely facing flange plates connected about a central die plate, said flange plates having essentially equisized central openings therethrough and having an inward taper towards said die plate, said die plate bearing a plurality of holes therethrough connecting the central openings through said flange plates, the total cross sectional area of said holes being less than the minimum cross sectional area of the central openings through said flange plates;
   (ii) a partially enclosed first section having a cross sectional area greater than the minimum cross sectional area through said flanges, said first section comprising a polyhedron with one or more faces wherein at least one face of said polyhedron provides a back wall cooperating with one of said flanges to provide an inlet for polymer melt into said polyhedron; one or more faces of said polyhedron providing an essentially planar base which relative to said inlet faces downward and slopes forward; one or more faces of said polyhedron providing a weir comprising relative to said base and said inlet one or more upwardly, outwardly facing surfaces and a plurality of holes through the base on the foot of the weir so that there are no areas of low flow in said polyhedron; said polyhedron having at least one or more upwardly facing openings, relative to said inlet, and having a first heating means positioned within said polyhedron at a height above said base but less than the vertical height of said weir; and
   (iii) spaced below but positioned to receive polymer melt overflow from said weir an essentially horizontal tray comprising a base having a plurality of strand forming holes therethrough, a continuous lip extending around the perimeter of said tray, and a second heating means positioned above said base but below the top of the lip.

2. The distributor according to claim 1 wherein said holes through said die plate are tapered or partially tapered in the direction of flow of polymer melt through said die plate.

3. The distributor according to claim 2 wherein said tray is positioned so that the major portion of the surface is directly below said polyhedron.

4. The distributor according to claim 3 further comprising a deflector comprising at least one vertical plate spaced apart but in front of said weir and descending to an edge on said tray.

5. The distributor according to claim 4 wherein said heating means is selected from the group consisting of electric resistance heaters and hot oil heaters.

6. The distributor according to claim 5, wherein said polyhedron comprises a prism having bases which are parallel and spaced about said inlet to said prism, said bases forming an irregular heptagon.

* * * * *